(12) United States Patent
Kukura et al.

(10) Patent No.: US 6,907,609 B1
(45) Date of Patent: Jun. 14, 2005

(54) OBJECT REQUEST DISPATCH USING MATCHING OF A SEGMENTED OBJECT KEY

(75) Inventors: Robert Allen Kukura, Natick, MA (US); Ronald Clarke Witham, Jr., Cambridge, MA (US)

(73) Assignee: IONA Technologies Plc., Dublin (IE)

( * ) Notice: Subject to any disclaimer, the term of this patent is extended or adjusted under 35 U.S.C. 154(b) by 0 days.

(21) Appl. No.: 09/241,925

(22) Filed: Feb. 1, 1999

(51) Int. Cl.[7] .............................................. G06F 3/00
(52) U.S. Cl. .................... 719/316; 707/103 R
(58) Field of Search ........................... 709/316, 330, 709/200.203, 315, 226, 236; 707/103 R, 100, 101, 102, 203, 103, 206, 204; 717/216; 719/316

(56) References Cited

U.S. PATENT DOCUMENTS

| | | | |
|---|---|---|---|
| 4,905,138 A | 2/1990 | Bourne | 364/200 |
| 4,994,998 A | 2/1991 | Anezaki | 364/900 |
| 5,210,535 A | 5/1993 | Fujita | 341/51 |
| 5,263,137 A | 11/1993 | Anezaki | 395/200 |
| 5,291,583 A | 3/1994 | Bapat | 395/500 |
| 5,317,742 A | 5/1994 | Bapat | 395/700 |
| 5,367,635 A | 11/1994 | Bauer et al. | 395/200 |
| 5,418,963 A | 5/1995 | Anezaki et al. | 395/700 |
| 5,452,433 A | 9/1995 | Nihart et al. | 395/500 |
| 5,519,868 A | 5/1996 | Allen et al. | 395/700 |
| 5,539,909 A | 7/1996 | Tanaka | 395/700 |
| 5,602,993 A | 2/1997 | Stromberg | 395/200.1 |
| 5,613,100 A | 3/1997 | Anezaki | 395/500 |
| 5,632,035 A | 5/1997 | Goodwin | 395/705 |
| 5,642,511 A | 6/1997 | Chow et al. | 395/701 |
| 5,649,227 A | 7/1997 | Anezaki et al. | 395/800 |
| 5,727,145 A * | 3/1998 | Nessett et al. | 713/200 |
| 5,991,823 A * | 11/1999 | Cavanaugh, III et al. | 709/304 |
| 6,003,083 A * | 12/1999 | Davies et al. | 709/226 |
| 6,014,700 A * | 1/2000 | Bainbridge et al. | 709/226 |
| 6,032,199 A * | 2/2000 | Lim et al. | 709/316 |
| 6,038,607 A * | 3/2000 | Hamilton et al. | 709/236 |
| 6,128,623 A * | 10/2000 | Mattis et al. | 707/103 |
| 6,128,627 A * | 10/2000 | Mattis et al. | 707/202 |

OTHER PUBLICATIONS

Gokhale et al. "Evaluating the Performance of Demultiplexing Strategies for Real–Time CORBA", IEEE, 1997.*
Odersky et al. "Two Ways to bake Your Pizza—Translating Parameterised Types into Java", IEEE, 1997.*
Translation of GDMO/ASN.1 Specification into CORBA–IDL, Jul. 14, 1994, 97 pages.
Common Facilities Architecture; 11/95.
wysiwyg://90/http://www.omg.com/corba/whatiscorba.html, What is CORBA?, Jun. 17, 1999.
http://pent21.infosys.tuwien.ac.at/Research/Corba/OMG/arch2.htm, CORBA Overview, Jun. 17, 1999.
http://www.nortel.com/RCP–ORB/, Nortel Networks: RCP–ORB—CORBA Compliant ORB, Jun. 17, 1999.
http://www7.nortelnetworks.com/corba/index.html, Nortel Networks: RCP–ORB—What is CORBA?, Jun. 17, 1999.
file:///C|/Windows/Desktop/overview.html, Nortel Networks: RCP–ORB—Product Overview, Jun. 17, 1999.

(Continued)

*Primary Examiner*—St. John Courtenay, III
*Assistant Examiner*—Van Nguyen
(74) *Attorney, Agent, or Firm*—Lacasse & Associates, LLC; Randy W. Lacasse

(57) ABSTRACT

A method for matching an object key is described. The method includes the steps of calculating one or more values determined by one or more portions of the object key and comparing the values with a plurality of stored data. The method also includes the step of selecting a stored datum matching the largest portion of the object key.

12 Claims, 2 Drawing Sheets

OTHER PUBLICATIONS wysiwyg://111/http/www.omg.com/corba/freestuff.html, Welcome to the CORBA Showroom!, Jun. 17, 1999.

http://www.dstc.edu.au/AU/staff/andreas–vogel/wiley–web/sample.html, Java Programming With CORBA by Andreas Vogel and Keith Duddy, Jun. 17, 1999.

http://www.dstc.edu.au/AU/staff/andreas–vogel/wiley–web/5.0.html, Chapter 5 A First Java ORB Application, Jun. 17, 1999.

http://www.dstc.edu.au/AU/staff/andreas–vogel/wiley–web/5.1.html, 5.1 Summary of the CORBA Development Process, Jun. 17, 1999.

http://www.dstc.edu.au/AU/staff/andreas–vogel/wiley–web/5.2.html, Environment Set–Up, Jun. 17, 1999.

http://www.dstc.edu.au/AU/staff/andreas–vogel/wiley–web/5.3.html, Interface specification, Jun. 17, 1999.

http://www.dstc.edu.au/AU/staff/andreas–vogel/wiley–web/5.4.html, Compiling the IDL, Jun. 17, 1999.

http://www.dstc.edu.au/AU/staff/andreas–vogel/wiley–web/5.5.html, 5.5 A Client as Java application, Jun. 17, 1999.

http://www.dstc.edu.au/AU/staff/andreas–vogel/wiley–web/5.6.html, 5.6 A Client as an Applet, Jun. 17, 1999.

http://www.dstc.edu.au/AU/staff/andreas–vogel/wiley–web/5.7.html, 5.7 An Object Implementation, Jun. 17, 1999.

http://www.dstc.edu.au/AU/staff/andreas–vogel/wiley–web/5.8.html, 5.8 A Server, Jun. 17, 1999.

http://www.dstc.edu.au/AU/staff/andreas–vogel/wiley–web/5.8.html, 5.9 Extending the Hello–World Example, Jun. 17, 1999.

http://www.dstc.edu.au/AU/staff/andreas–vogel/wiley–web/5.8.html, TECS: Papers: A Quick Tour Of the CORBA Security Service, Jun. 17, 1999.

wysiwyg://151/file:/C|/Windows/Desktop/tombook.html, The Essential CORBA. . . How to order. . ., Jun. 17, 1999.

wysiwyg://162/file:/C|/Windows/Desktop/oma.html, OMA Executive Overview, Jun. 17, 1999.

file:///C|/Windows/Desktop/tutorial.htm, Tutorial on Distributed Objects, Jun. 17, 1999.

* cited by examiner

OBJECT REQUEST DISPATCH USING MATCHING OF A SEGMENTED OBJECT KEY

FIELD OF INVENTION

The field of the invention is distributed object technology; more specifically, the invention relates to dispatching of requests between components in object environments including object request brokers.

BACKGROUND

The Common Object Request Broker Architecture (CORBA) of the Object Management Group (OMG) is a set of specifications defining a language-independent distributed object architecture including object request brokers (ORBs) for transparently managing the details of making requests and receiving responses of remote objects. Details on CORBA, including the complete specification, may be had from the Object Management Group, 492 Old Connecticut Path, Framingham, Mass. 01701.

In order for CORBA object implementations to interact with CORBA ORBs, object adapters (OAs) are used. Object adapters provide a standardized interface for object implementations, but themselves communicate with ORBs via vendor-specific interfaces. Object adapters are responsible for demultiplexing requests from remote clients and dispatching the requests to appropriate servant object implementations, activating and deactivating objects and generating object references among other functions.

Object request broker servers typically comprise transport functionality, such as an implementation of the OMG's IIOP transport protocol, and object adapter (OA) functionality, such as an implementation of the CORBA POA. Object adapter functionality includes any facility for executing method implementations in response to invoked operation requests. Other transports and object adapters may be included in addition to or instead of IIOP and the POA. In a server ORB, a transport receives requests sent by client ORBs, which are then dispatched to the proper object adapter. Requests received from local invocation interfaces rather than from transports may also need to be dispatched to the proper object adapter. The ORB server may also include other ORB service functionality that is involved in processing requests, such as security, transaction, or management services.

ORB clients in the CORBA environment use Interoperable Object References (IORs) generated by servers to request operations on target objects. The CORBA specification describes a structural framework for CORBA IORs, comprising a set of profiles. Profiles may include a portion called the object key that may be included in client request messages to identify the target object of the request. The object key format is not specified by CORBA and may be opaque (not parsed or interpreted) to application developers and to client side ORBs.

SUMMARY

In one aspect, the present invention comprises a mechanism by which requests received from a transport or any other source are dispatched to the object adapter or other entity or set of entities, possibly including ORB services, for further processing. In another aspect, the invention comprises a system for encoding object keys into a series of segments. Still another aspect of the invention comprises a system for finding a best match among data. A further aspect comprises using the encoding scheme and system for matching to dispatch requests within an object request broker or other request processing device.

In another aspect, the present invention comprises a method for matching an object key comprising the steps of calculating one or more values determined by one or more portions of the object key, comparing the values with a plurality of stored data; selecting a stored datum matching the largest portion of the object key. In this aspect the values may be hash values, and the stored data may be values determined by object keys. Further, the stored data may be hash values.

Another aspect of the invention is an object key comprising one or more segments, at least one segment further comprising a length field and a data field, wherein the length of the data field may be determined from the length field. The length field further may comprise a first length subfield and a second length subfield, and the length of the second length subfield may be determined from the first length subfield. The length field and the data field together may comprise at least 90 percent of the segment.

Still another aspect of the invention comprises a method of dispatching requests to targets in a distributed computing system comprising the steps of receiving an object key; matching an object key against a plurality of registered object key portions; selecting a handler for the request based on the results of the matching. The object key portions may comprise partial or complete object keys. The handler may be a plug-in DLL or shared library. The method may further comprise the step of registering a portion of the object key in association with a second handler.

DETAILED DESCRIPTION

An ORB system may be structured with transport implementations, OA implementations, and other ORB service implementations as separate components that plug into an ORB core. An ORB environment might contain any number of each type of plug-in. For example, several different transport plug-ins might be capable of receiving requests sent by clients using different protocols. Different sets of objects implemented in an ORB environment might be implemented using different OA plug-ins. In a preferred implementation, the transport plug-ins are implemented without knowledge of or dependencies on the specific OA and ORB service plug-ins that will be responsible for processing requests they receive. Similarly, OA plug-ins are implemented without knowledge of or dependencies on the specific transport plug-ins or other entities that might deliver requests to them. The operative association between plug-ins may be established at link time or runtime, rather than at compile time.

In one aspect, the present invention comprises a mechanism by which requests received from a transport or any other source are dispatched to the object adapter or other entity or set of entities, possibly including ORB services, for further processing. In another aspect, the invention comprises a system for encoding object keys into a series of segments. Still another aspect of the invention comprises a system for finding a best match among data. A further aspect comprises using the encoding scheme and system for matching to dispatch requests within an object request broker or other request processing device.

Figure 1:
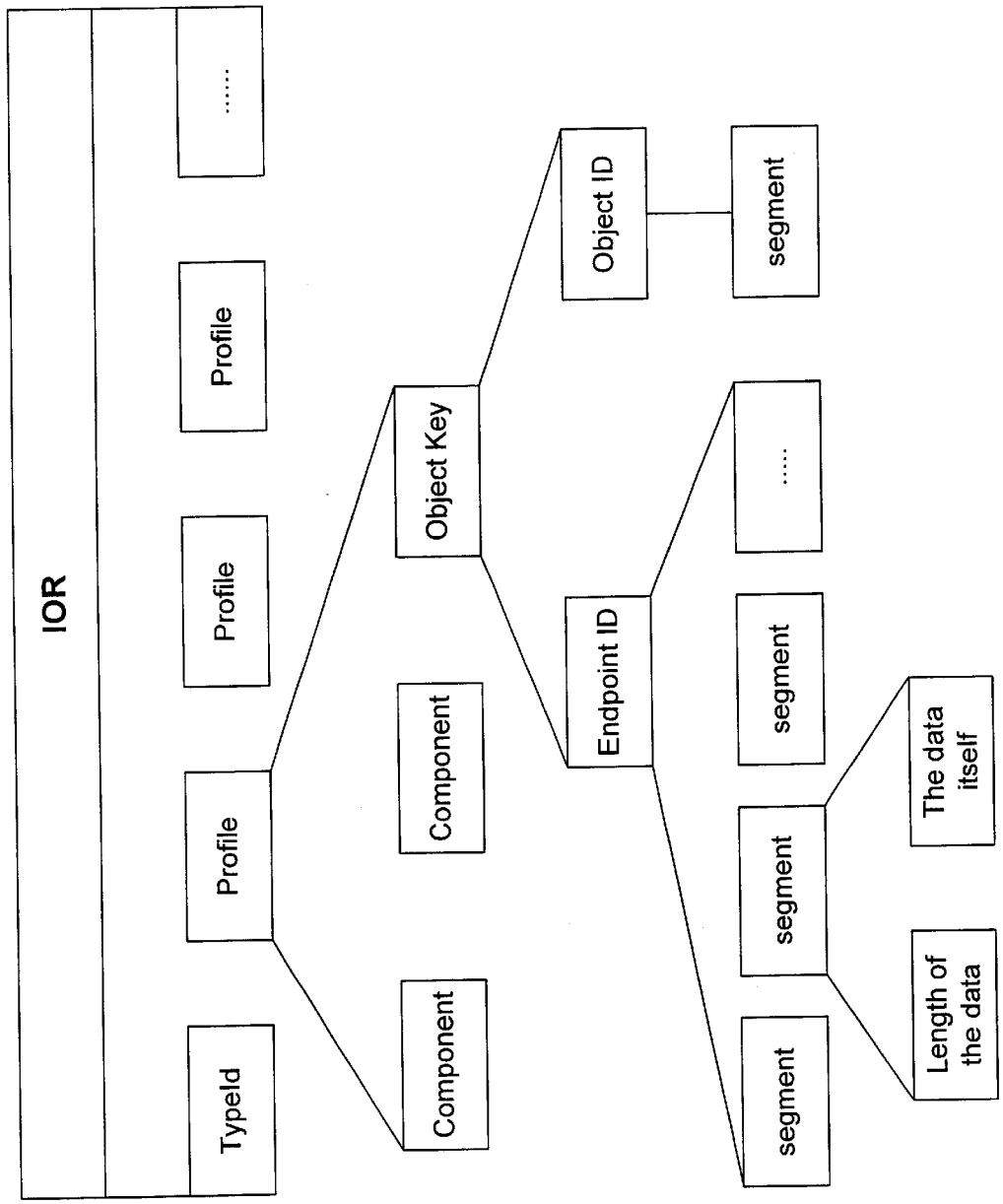
FIG. 1 schematically illustrates a preferred relationship between an IOR, object key, segments, endpoint identifier and object identifier.

The object key of the present invention comprises an arbitrary number of segments, which can contain arbitrary data. The present invention further comprises a particular format for such segments, comprising endpoint identifier segments and at least one object identifier segment. The relationship between an IOR, object key, endpoint identifier and object identifier is schematically illustrated in FIG. 1.

Format of a Segment

A segment comprises an arbitrary sequence of data. In a preferred embodiment, a segment comprises a length portion and a data portion. The length field may be fixed of variable length, and is preferably a prefix of the data field, or occupies a known position within the sequence. Such segments are advantageous because they may be used with arbitrary encapsulated data without the use of delimiting characters or escape sequences, and because they may be parsed without examining each octet of the sequence. However, aspects of the present invention may be used in conjunction with other segment formats, such as those using escape sequences or delimiting characters.

In one embodiment, a segment is implemented as a sequence of octets with two logical fields. The first field contains the length of the second field, which contains the data of the segment. For example, if the data to be contained in the segment is the string "my_obj2/0" (seven octets long, followed by a null termination character), the octet representation of the segment would be:
[08 6d 79 5f 6f 62 6a 32 001].

For large segments more than one octet can be used to indicate the length. If the high order bit of an octet in the length section is set, then the following low order 7 bits is concatenated to this octet's low order 7 bits to calculate the length of the data field. For example, if the data field of a segment is 300 octets long, the length field is encoded as follows—The binary for 300 is 00000001 00101100, which is too long to fit into a single octet. We therefore set the high order bit of the first octet and split the bits into two octets:
0b10000010 0b00101100 (0b0000010 0b0101100=300)
followed by 300 octets for the data.

With this encoding we can represent data lengths of up to 127 with one octet, and up to 16383 with two octets. This encoding scheme will scale to any size by simply adding in more octets to the length field. The length field can be used to represent the length of any size data field.

A second embodiment comprises a first length field that indicates the length of a second length field. The second length field indicates the length of the data field. For example, in a preferred embodiment, the first two bits of a segment comprise the first length field and encode the number of octets comprising the second length field. The second length field comprises the length of the data field. The first length field may be some bits (for example, two) of the first octet, and the remaining bits of the first octet may be part of the second length field. In such an embodiment, the first length may represent the number of additional octets beyond the first used to encode the second length field.

For example, to represent a segment comprising a data field 65836 octets long, the length field may be encoded as follows: the binary for 65836 is 00000010 0000010 0101100, which is too long to fit into one or two octets. We therefore set the first two bits to 10 to indicate that two additional octets beyond the first are used to encode the length of the data. The remaining 22 bits of the first three octets encode the length of the data which follows:
0b0000010 0b00000010 0b00101100 (0b00000010 0b0000010 0b0101100=65836)
followed by 65836 octets for the data.

For the remainder of this description, the first embodiment of length encoding is used. In the examples disclosed, the offset of the length portion from the beginning of the segment is zero, but any offset may be used. In addition, any mapping from values of the length field to length of the data field may be used. In a preferred embodiment, the value of the length field is a binary number indicating the number of octets of the data field.

Figure 2:
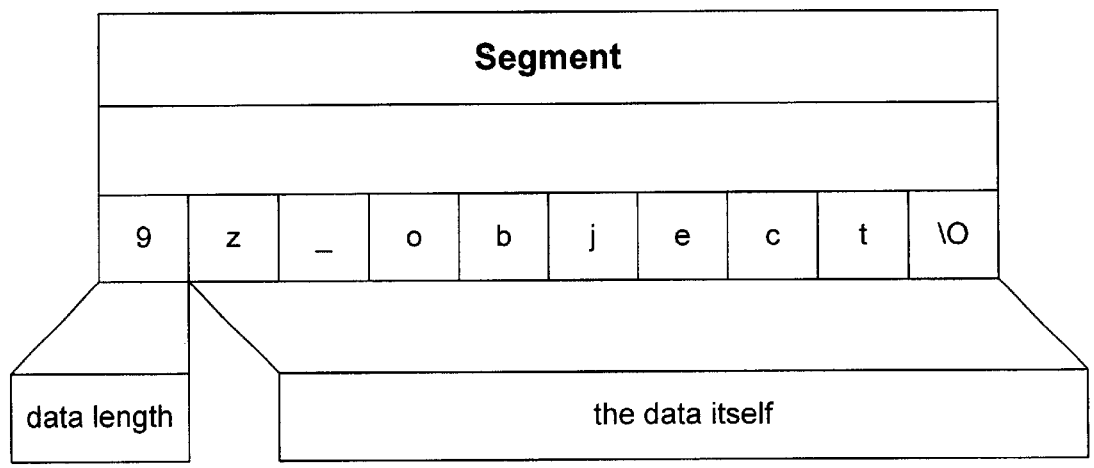
FIG. 2 illustrates the distinction between the data length and the encoded length of a preferred segment.

A distinction is made between the data length of a segment and the encoded length of a segment. The former is the first field in the segment and contains the length of the other "data" field in the segment. The latter refers to the length in octets of the entire segment, including the data length field. FIG. 2 shows the distinction between the two.

Parsing the Object Key

The object key is parsed by determining the offset at which the data portion of the first segment begins from the length portion of the segment. The beginning of the length portion of each subsequent segment is determined from the end of the data portion of the previous segment, permitting determination of the beginning of the data portion of the segment. The object key may thereby be efficiently parsed into a plurality of data segments.

Object Key Matching

The present invention performs a "best match" on the object key to map the request to a handler, such as an object adapter or set of interceptors or other configurable service entity in a distributed computing environment. On the client side, the match could map the request to a proxy selection. Other uses of object key matching include making security decisions, for example, in firewalls. A best match seeks to match as many initial components of the object key as possible against entries in an available set of partial or compete object keys or references, such as an interceptor registry used in a server or implementation repository (IMR) as described in the related application entitled "A method and system for providing object references in a distributed object environment supporting object migration" incorporated herein by reference.

One preferred embodiment of object key matching proceeds as follows. The object key is scanned (for example, byte-for-byte) from beginning to end, and a cumulative hash value is calculated at each step. At the end of each segment, the cumulative hash value is stored (for example, in an array, or preferably pushed onto a stack). After the scan is complete, the last hash value (for the entire object key) is looked up in the repository. If no match is found, the preceding hash value (for all but the last segment) is looked up. This process is repeated until either a match is found or no match is found for the first hash value. If the hash value is found, the set of segments used to compute the hash value is compared against the key that is registered in the table. If the set of segments used to compute the hash value is the same as the segments used for the comparison, a match is found.

Segmented object key

The object key of the present invention comprises an ordered collection of one or more segments. In a preferred embodiment, segments are ordered according to the number of object keys having the segment in common. For example, segments that are common to more object keys preferably come before those common to less. At any segment boundary, the remaining segments discriminate between the set of accessible objects for which the preceding segments are common.

In a preferred implementation, the last segment is referred to as the object identifier, and discriminates between individual target objects. For example, in a preferred embodiment, the object identifer corresponds to the POA object_id. All segments preceding the object identifier segment are collectively referred to as the "endpoint identifier".

Preferably, the initial segment is a "format identifer" segment indicating how subsequent segments may be interpreted. For example, each supported OA in a plug-in architecture may be assigned one or more format identifier segment values to identify one or more systems for parsing and/or interpreting segments for use in connection with the OA.

In a preferred embodiment, the complete object key comprises a concatenation of the endpoint identifier and object identifier segments. The format identifier is preferably the first segment in the endpoint identifier.

An object identifier is a user- or system-specified identifier used to "name" an object within the scope of its endpoint identifier. Preferably, each is unique within the endpoint where it is created or registered. In a preferred embodiment, the object identifier is the last segment in the object key. The format identifier segment preferably determines the format of both the remaining endpoint identifier segments, and of the object identifier segment or segments.

Request Dispatch Based on object key Best Match

The best matching system of the present invention may be advantageously used in the dispatch of object requests. The object key matching may be used to resolve the next handler or a target object for the IOR from which the object key was derived. Handlers may include interceptors, or other objects. Typically the handler is passed the complete object key used to invoke the interceptor. The handler may in turn invoke another handler or object directly, or may perform another best match of the object key to resolve another handler to handle the request or target. The chain of handlers may be of arbitrary length.

As each handler or target is resolved, the handler, target or the entire chain may be registered in connection with the partial or complete object key with which they were matched. As a result, the next invocation with the same partial or complete object key will resolve directly to the registered handler, target or chain, because the more recently registered partial or complete object key will result in a better match than the previously registered object key or keys which led to the resolution and subsequent registration of the handler, target or chain. For example, a request may cause a POA to be activated and cause registration of a handler for the partial object key corresponding to that POA.

For example, target endpoint identifiers and identifiers for other handlers for processing requests may be registered in the in the interceptor registry of a server or IMR using a segmented key. An endpoint identifier of the system may comprise a fully qualified POA name comprised of the names of all of the parent POAs for the endpoint. Requests are dispatched to the registered handler that matches the most segments of the object key received.

Similarly in a plug-in architecture, the best-match system may be used to dispatch object requests received by transport plug-ins to the proper object adapter and/or ORB service plug-ins. In such a system, the transports and object adapters may be separately developed and have no direct knowledge of each other.

The best-match system may also be used to dispatch object requests to different destinations based on the functionality being performed (for example, a server vs. location agent), obviating the need for the transport to have information of which service is being provided.

A best-match system may further be used to perform activation as an incident of dispatching object requests. In processing a first invocation, a number of initial segments are matched. Processing of this invocation causes a key to be registered that will match more segments of a similar or identical subsequent invocation, resulting in less work being needed to perform the subsequent invocation.

The present invention is preferably adapted to function in an architecture that allows plug-ins to participate in the processing of requests by supplying interceptors (services implementing an interceptor interface) that are included in bindings. In a preferred system, transport protocols such as GIOP, ORB services such as transactions and object adapters such as the POA are all packaged as plug-ins and implemented as interceptors. A binding is the set of interceptors involved in communication between a particular client and a particular object or set of objects. Different interceptor and binding interfaces are typically involved in the client and server roles that make up an invocation.

In a preferred embodiment, the present invention comprises a binding manager used by transport and object adapter plug-ins to manage server bindings. Preferably a binding manager instance is provided for each ORB in the system. The binding manager supports a server-side binding by maintaining a table, referred to as the interceptor registry, that maps complete or partial object keys to server binding instances. An object adapter creates and registers a server binding instance with the binding manager, associating a chain of server request interceptors specified in the registration request with a full or partial object key specified also in the registration request.

A transport subsequently invokes the binding manager in order to obtain the server binding instance that will be used to dispatch a received normal request or locate request. The transport passes the received object key as a parameter to the invocation. The binding manager finds the registered server binding whose object key best matches the specified object key, and returns its reference to the transport. The transport uses the returned server binding to dispatch the request to the registered ORB services and/or object adaptor.

If there is no registered server binding that completely or partially matches the specified object key, a handler may then be registered that extracts the format identifier and registers a handler for that format. In addition, or alternatively, handlers may be registered for known format identifiers that, when invoked, load and/or initialize plug-in functionality associated with that format. This results in a handler registered to match just the format identifier that can process keys of subsequent requests in that format.

When only the format segment is matched, the format-specific handler can then activate an endpoint identified by additional segments. This might result in registering a handler that matches the format plus these additional segments, thereby avoiding the need to parse and interpret any of these segments on subsequent invocations.

When the format and endpoint identifier segments are matched, the handler might register a handler that matches the entire object key, avoiding the need to parse and interpret the object identifier segment on subsequent invocations.

The process of mapping object requests to plug-in handlers based on a best match of initial object key segments, in conjunction with initial object key segments comprising OA-specific format identifiers enables a transport to flexibly dispatch object requests to OAs that are developed independently from the transport. The transport can make such dispatches without any designed in ability to parse or interpret object keys utilized by target objects, endpoints, or associated handlers.

A preferred embodiment supports POA endpoints, and at least two endpoint format identifiers—one for transient endpoint identifiers and one for persistent endpoint identifiers. A trade-off exists between reducing space taken up by the endpoint format identifier in the object key and supporting many endpoint identifier formats. In a preferred embodiment, two octets are used to signify the endpoint format identifier. The first octet refers to whether the endpoint is transient or persistent, represented by the octet "1" or "2" respectively, and the second octet is a version number.

For example, an endpoint format identifier segment for a persistent object could be encoded as [02 31 31]. This represents a segment with a data length of two octets. The first octet signifies that the endpoint is for persistent objects, and the second octet signifies that version one of this endpoint format identifier. The ASCII codes for '1' and '2' are 31 and 32 respectively, and the persistent object above represents version 1 of a POA endpoint format identifier.

The following sections describe how an endpoint identifier may be constructed in a POA for transient and persistent objects.

Transient Endpoint Identifier

The format of endpoint identifiers for transient POAs is designed to avoid accidental re-use of old (and no-longer valid) object references and to permit efficient use of a "best match" lookup.

A transient endpoint identifier comprises: the POA transient endpoint format identifier and a unique system-dependent identifier (USDI). In the present example embodiment, the POA transient endpoint format identifier is "31" "31" and the USDI is a segment consisting of a twelve octets. The first four octets contain a random number, the second four octets contain a timestamp, and the final four octets contain a system-dependent process id. The random number and timestamp ensure that transient object keys are unique object key within the same process and cannot be accidentally re-assigned. Other combinations of these and/or other system dependent data may be used. An example transient endpoint identifier is shown in the following table:

| Endpoint Format Id length | Format Id | USDI Length | USDI |
|---|---|---|---|
| 02 | 31 31 | 12 | (ASCII) 56A4100D56F5 |

Indirect Persistent Endpoint Id

Indirect endpoint identifiers are used to create indirect IORs as described in more detail in a related application entitled "A method and system for providing object references in a distributed object environment supporting object migration" by Robert Kukura, Julie Salamone and Ronald Witham filed on the same day as the present application and incorporated herein by reference.

The endpoint identifier for indirect persistent objects comprises the following: a persistent endpoint format identifier, a location domain identifier, and the fully qualified POA name (FQPN). In the present example embodiment, the persistent endpoint format identifier is '32' '31'. An example of the format and a Persistent endpoint identifier for a sub-POA named "subpoa1" is shown in the following table:

| Endpoint Format Id length | Format Id | Location Domain Length | Location Domain | FQPN Length | FQPN |
|---|---|---|---|---|---|
| 02 | 32 31 | 04 | (ASCII) IONA | 08 | (ASCII) subpoa1\0 |

CORBA specifies that the RootPOA has the TRANSIENT Lifespan policy. In a preferred embodiment, a transient endpoint identifier will generally be created in a sub-POA, and so will generally have a FQPN segment.

Direct Persistent Endpoint Id

The endpoint identifier for direct persistent objects comprises the following: the direct persistent endpoint format identifier—'33' '31', and the fully qualified POA name. In the present example, the direct persistent endpoint format identifier is "33" "31". The format and an example of a direct persistent endpoint identifier for a sub-POA named "direct_poa_1" are shown below.

| Endpoint Format Id length | Format Id | FQPN Length | FQPN |
|---|---|---|---|
| 02 | 33 31 | 13 | (ASCII)direct_poa_1\0 |

CORBA specifies that the RootPOA has the TRANSIENT Lifespan policy. In a preferred embodiment, a persistent endpoint identifier will generally be created in a sub-POA, and so will generally have a FQPN segment.

Format of the Fully Qualified POA Name (FQPN)

In a preferred embodiment, the endpoint identifier for PERSISTENT POAs contains the fully qualified POA name. The ORB may use this field to determine which POAs are needed to service a request, so it may activate any needed POAs. In a preferred embodiment, the FQPN is stored as a series of null-terminated strings within a single segment. For example, the FQPN for ChildC in the following hierarchy:

```
RootPOA
   ChildA
      ChildB
         ChildC
``` may be represented as follows: ChildA\0ChildB\0ChildC\0 where \0 represents null. The RootPOA implicit in the FQPN, since it forms the base of every POA hierarchy.

While a preferred embodiment stores the entire FQPN in one segment, alternative embodiments will be readily apparent. One such embodiment stores each individual POA name of the FQPN as a separate segment.

ORB Generated Object Identifiers

Object identifiers may be system generated, or created in a manner specified by the application developer. In a preferred embodiment, some object identifiers are system generated as described below.

Transient Objects

In one embodiment, object identifiers generated by transient POAs consist of four octets, containing a monotonically increasing CORBA::ULong. The first object identifier will be assigned 0, the next 1, and so on. Although this format is open to the possibility of duplicate identifiers, the large size of CORBA::ULong implies the server would need to create 4 billion objects before identifier duplication could occur.

Indirect Persistent Objects

In one embodiment, if an object identifier for an object is to be generated by the POA with the PERSISTENT lifespan policy, for example when create_reference( ) is called on the POA, it provides an object identifier segment with an encoded length of nine octets. This object identifier is preferably a series of octets in network byte order, containing a CORBA IDL struct that consists of two CORBA::ULong fields. The first ULong is called the "POA Activation Sequence Number". If the POA uses indirect persistence, this number is obtained from the location service (see the related application "A method and system for providing object references in a distributed object environment supporting object migration" incorporated herein by reference).

The sequence number is initialized, for example, to 1 and is incremented by the locator each time the POA activates. If the POA uses direct persistence, the activation number may be randomly generated. The second ULong is local to the POA and is preferably of the same format as described in the section on transient objects above—it contains a CORBA::Ulong in network byte order.

The use of the POA activation sequence number is advantageous as the CORBA::ULong local to the POA will be initialized to one at the start of every process, so if the Persistent POA is in a process that is restarted, subsequent ORB-generated object identifiers will not clash with object identifiers generated by the previous process.

An example object identifier segment for a persistent object would be the octet sequence:

[08 00 00 00 01 00 00 00 0A]

Format of a Complete object_key

Example formats for complete object keys of several types are described in this section.

Transient object_key

An example object key for a transient object in a sub-POA with a user-provided object identifier object identifier is shown below. The length fields are in bold and unprintable characters are represented by a '*'.

[02] 31 31 [08] A3 E8 80 01 00 00 00 09 [0A] 6D 79 5F 6F 62 6A 65 63 74 00
 "*11*********my_object"

| endpoint identifier | | |
|---|---|---|
| endpoint format identifier | endpoint identifier | object identifier |
| 31 31 | A3 E8 80 01 00 00 00 09 | my_object\0 |

Indirect Persistent object_key

An example object key for an indirect persistent object in a sub-POA with a user-provided object identifier object identifier is shown below. The length fields are in bold and unprintable characters are represented by a '*'.

[02] 32 31 [09] 61 72 74 2D 69 6E 76 6F 62 [0B] 72 65 74 61 69 6E 5F 70 6F 61 00
 [15] 6D 79 5F 70 65 72 73 69 73 74 65 6E 74 5F 6F 62 6A 65 63 74 00
 "*21*art-invob*retain_poa*my_persistent_object"

| endpoint identifier | | | |
|---|---|---|---|
| endpoint format id | location domain | persistent POA FQPN | object identifer |
| 32 31 | (ASCII) art-invob | (ASCII) retain_poa\0 | (ASCII) my_persistent_object\0 |

Direct Persistent object_key

An example object key for a direct persistent object in a sub-POA with a user-provided object identifier object identifier is shown below. The length fields are in bold and unprintable characters are represented by a '*'.

[02] 33 31 [0B] 72 65 74 61 69 6E 5F 70 6F 61 00
 [15] 6D 79 5F 70 65 72 73 69 73 74 65 6E 74 5F 6F 62 6A 65 63 74 00

| endpoint identifier | | |
|---|---|---|
| endpoint format identifier | persistent POA FQPN | object identifier |
| 33 31 | (ASCII) retain_poa\0 | (ASCII) my_persistent_object\0 |

What is claimed is:

1. A method for matching an object key of an object reference having a plurality of segments, the method comprising the steps of:
   sequentially calculating and cumulating hash values for said segments of the object key,
   comparing at least one of the cumulated hash values with a plurality of stored data, said comparing at least one of the cumulated hash values with a plurality of stored data further comprising, the steps of comparing the last cumulated hash value with a plurality of stored data, if no match is identified, comparing the preceding cumulated hash value to said plurality of stored data, continuing these steps until a matching cumulated hash value is identified, and
   upon finding a match, selecting a stored datum that best matches a set of segments of the object key for which the cumulated value was calculated.

2. The method of claim 1 wherein the stored data are values determined by portions of object keys.

3. The method of claim 1 wherein the stored data are hash values.

4. The method of claim 1 wherein said sequentially calculating and cumulating steps comprise calculating hash values for a first through last segment of said object key.

5. The method of claim 4 wherein said calculating and cumulating hash values comprises calculating a hash value for each successive segment, combining to a previous hash, and storing.

6. A method for best matching an object key of an object reference having a plurality of segments, the method comprising the steps of:

scanning said object key, sequentially calculating and cumulating hash values for each segment of said object key, when scanning is complete, comparing the last cumulated hash value with a plurality of stored data, if no match is identified, comparing the preceding cumulated hash value to said plurality of stored data, continuing these steps until a matching cumulated hash value is identified; and selecting a best match to said plurality of stored data based on a comparison to a set of the segments for which the matching cumulated hash value was calculated.

7. A method for best matching an object key of an object reference having a plurality of segments, as per claim 6, wherein said object key segments collectively comprise a reference/identifier of an endpoint.

8. A method for best matching an object key of an object reference having a plurality of segments, as per claim 7, wherein said object identifier is the last segment in said object key.

9. A method for best matching an object key of an object reference having a plurality of segments, as per claim 7, wherein said endpoint identifier further comprises a format identifier.

10. A method for best matching an object key of an object reference having a plurality of segments, as per claim 9, wherein said format identifier is located in a first segment of said endpoint identifier.

11. A method for best matching an object key of an object reference having a plurality of segments, as per claim 6, wherein said best match seeks to match as many initial components of the object key as possible.

12. A method for best matching an object key of an object reference having a plurality of segments, as per claim 6, wherein said best match seeks to match as many initial components of the object key as possible against available partial or complete stored.

* * * * *